United States Patent
Thorpe et al.

(10) Patent No.: US 9,243,963 B2
(45) Date of Patent: Jan. 26, 2016

(54) TOTAL TEMPERATURE PROBE

(71) Applicant: ROLLS-ROYCE PLC, London (GB)

(72) Inventors: Steven John Thorpe, Sileby (GB); Clare Bonham, Nuneaton (GB); Mark Nicholas Erlund, Lincoln (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 13/938,800

(22) Filed: Jul. 10, 2013

(65) Prior Publication Data

US 2014/0037430 A1 Feb. 6, 2014

(30) Foreign Application Priority Data

Jul. 31, 2012 (GB) ................... 1213576.0

(51) Int. Cl.
*G01K 13/02* (2006.01)
*G01K 13/12* (2006.01)

(52) U.S. Cl.
CPC ................... *G01K 13/028* (2013.01)

(58) Field of Classification Search
CPC ............ G01K 13/028; G01K 2205/00; G01K 2205/02; G01K 2205/04
USPC ......... 374/163, 141, 143, 137, 112, 114, 166, 374/148, 100, 144, 208, 185, 179; 73/112.01; 415/118
See application file for complete search history.

(56) References Cited

U.S. PATENT DOCUMENTS

| | | | |
|---|---|---|---|
| 2,931,227 A | 4/1960 | Werner et al. | |
| 2,970,475 A | 2/1961 | Werner | |
| 3,170,328 A | 2/1965 | Werner et al. | |
| 3,331,246 A * | 7/1967 | Clark et al. | 374/148 |
| 3,451,268 A * | 6/1969 | Meador | G01K 1/12 374/144 |
| 3,459,040 A * | 8/1969 | Halbach | 374/35 |
| 3,665,763 A * | 5/1972 | Grey | 374/35 |
| 3,769,792 A * | 11/1973 | Grey | 60/39.281 |
| 3,788,143 A * | 1/1974 | Gabriel | F01D 17/085 374/144 |
| 4,038,105 A | 7/1977 | Brandeberry et al. | |
| 4,132,114 A * | 1/1979 | Shah | G01K 1/14 374/144 |
| 4,244,222 A * | 1/1981 | Hoyer | F01D 17/02 136/230 |
| 4,275,603 A * | 6/1981 | Kalocsay | 73/861.68 |
| 4,403,872 A | 9/1983 | DeLeo | |
| 4,426,161 A * | 1/1984 | Gabriel | F01D 17/085 374/138 |

(Continued)

FOREIGN PATENT DOCUMENTS

GB 2246203 A * 1/1992 ................ G01F 1/46

OTHER PUBLICATIONS

Zeisberger, A., "Total Temperature Probes for Turbine and Combustor Applications," *ISABE*, 2007, pp. 1-8, published by the American Institute of Aeronautics and Astronautics, Inc.

(Continued)

*Primary Examiner* — Gail Kaplan Verbitsky
(74) *Attorney, Agent, or Firm* — Oliff PLC (57) ABSTRACT

A total temperature probe comprising a hollow elongate shroud defined by a shroud wall that envelops a first cavity. The shroud wall is comprised of an inner skin and an outer skin which enclose a second cavity therebetween. A temperature sensor mounted in the first cavity. In use, fluid flow is received into the first cavity, passes through at least one aperture in the inner skin into the second cavity and then passes out of the shroud through at least one aperture in the outer skin. Beneficially, heat conduction across the inner skin is minimal.

16 Claims, 5 Drawing Sheets

(56) References Cited

U.S. PATENT DOCUMENTS

| | | | |
|---|---|---|---|
| 4,432,658 A | 2/1984 | Harman et al. | |
| 4,572,677 A * | 2/1986 | Sehgal | G01K 13/02 |
| | | | 136/230 |
| 4,733,975 A * | 3/1988 | Komanetsky | G01K 13/02 |
| | | | 244/53 R |
| 5,302,026 A | 4/1994 | Phillips | |
| 5,466,067 A | 11/1995 | Hagen et al. | |
| 5,628,565 A | 5/1997 | Hagen et al. | |
| 5,653,538 A * | 8/1997 | Phillips | 374/138 |
| 5,731,507 A | 3/1998 | Hagen et al. | |
| 7,111,982 B1 * | 9/2006 | Swonger, Jr. | 374/143 |
| 7,313,963 B2 * | 1/2008 | Kuznar | 73/700 |
| 7,328,623 B2 * | 2/2008 | Slagle | G01K 13/02 |
| | | | 374/E13.006 |
| 7,377,687 B2 * | 5/2008 | Chana | 374/110 |
| 8,157,440 B2 * | 4/2012 | Kulczyk | 374/138 |
| 2004/0237641 A1 | 12/2004 | Hanson et al. | |
| 2005/0193812 A1 * | 9/2005 | Ice | 73/170.02 |
| 2005/0232332 A1 * | 10/2005 | Hanson et al. | 374/141 |
| 2005/0273292 A1 * | 12/2005 | Severson et al. | 702/130 |
| 2005/0281312 A1 * | 12/2005 | Chana | 374/110 |
| 2010/0293959 A1 * | 11/2010 | Remy et al. | 60/773 |
| 2011/0208400 A1 * | 8/2011 | Lickfold et al. | 701/100 |
| 2011/0282595 A1 * | 11/2011 | Severson | 702/47 |
| 2015/0198091 A1 * | 7/2015 | Lefebvre | F02C 7/12 |
| | | | 60/806 |

OTHER PUBLICATIONS

British Search Report issued in British Patent Application No. GB1213576.0 on Dec. 3, 2012.

* cited by examiner

TOTAL TEMPERATURE PROBE

The present invention relates to a probe for measuring total temperature of a fluid. The probe has applications in measuring total temperature at locations in a gas turbine engine or other gas flow.

Figure 2:
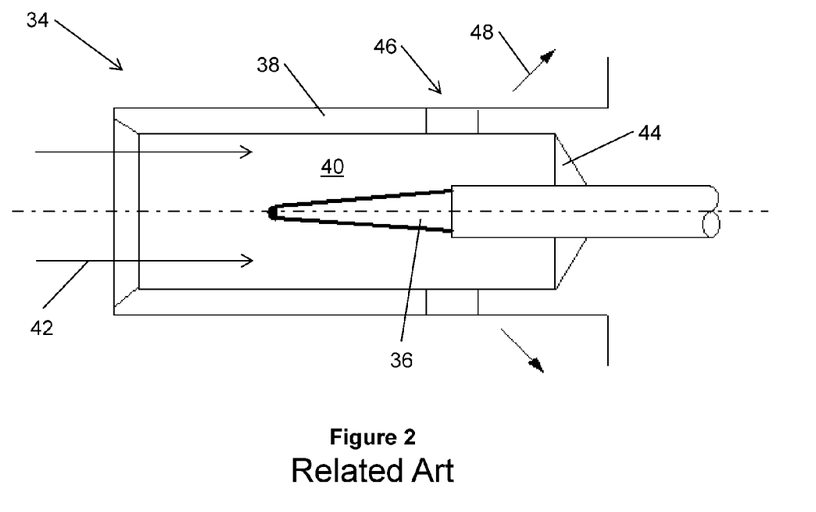
FIG. 2 is a schematic longitudinal section through a conventional Kiel probe.

A so-called "Kiel" probe is known and is shown in FIG. 2. The Kiel probe 34 comprises a temperature sensor 36 and a shroud 38. The shroud 38 is annular and defines a cavity 40 into which fluid flow passes, as shown by arrows 42. The temperature sensor 36 is located at a closed end 44 of the cavity 40. The shroud 38 also includes one or more apertures 46, often an annular array of apertures 46, towards the closed end 44 of the cavity 40 through which fluid can flow out of the cavity 40, as shown by arrows 48. The probe arrangement controls the fluid flow in which the temperature sensor 36 is bathed by reducing the fluid flow velocity. The temperature sensor 36 is less sensitive to the incident angle of the fluid flow to the probe 34 and has a high recovery factor relative to an unshrouded probe.

Recovery factor (RF) is defined as the division of the difference between measured and static temperature by the difference between total and static temperature, thus:

$$RF = \frac{\text{Measured} - \text{Static}}{\text{Total} - \text{Static}}.$$

Static temperature is as if measured moving with the flow whereas total temperature is as if measured when the flow has been brought to a halt isentropically. Because it is not possible to exactly match flow speed to measure static temperature or to bring the flow to a complete halt as some movement is required to enable convective heat transfer, it is necessary to know the error in the measured temperature so that measurements may be corrected. The RF is used for this purpose.

One disadvantage of this arrangement of probe 34 is that the fluid flow that passes along the outside of the shroud 38 is not slowed by the constriction of the shroud and so travels more quickly and has a lower RF effect than the fluid flow 42 through the cavity 40. Consequently there is significant heat conduction from the temperature sensor 36 and its mounting stem through the shroud wall to the outside of the shroud 38. This means that the temperature measured by the temperature sensor 36 is lower than the total temperature.

A further disadvantage of the conventional Kiel probe 34 is that the amount by which the measured temperature differs from the total temperature is dependent on many factors including the temperature, pressure, speed and turbulence of the fluid flow. Thus it is non-trivial to determine the total temperature from the measured temperature, even with a known RF.

The present invention provides a total temperature probe that seeks to address the aforementioned problems.

Accordingly the present invention provides a total temperature probe comprising: a hollow elongate shroud defined by a shroud wall that envelops a first cavity; the shroud wall comprising an inner skin and an outer skin which enclose a second cavity therebetween; a temperature sensor mounted in the first cavity; wherein, in use, fluid flow is received into the first cavity, passes through at least one aperture in the inner skin into the second cavity and thence passes out of the shroud through at least one aperture in the outer skin, such that heat conduction across the inner skin is minimal.

Advantageously the present invention controls heat transfer along the temperature sensor and its mount stem by thermally insulating the base of the stem using a relatively stagnant air pocket.

Advantageously the total temperature probe according to the present invention is more accurate because it has a high recovery factor which is substantially independent of Mach number, Reynolds number and installation effects unlike known probes. Furthermore, the variation of measured temperature is more accurately known and therefore correction for it is more achievable.

The inner skin and the outer skin may be separated by a constant distance. Beneficially this maintains consistent thermal isolation.

The first and second cavities may be coextensive.

The shroud may be annular. The inner and outer skins may be coaxial. Beneficially the fluid flows are regular and predictable in this arrangement.

The shroud may be a regular polygon prism, that is an axial projection of a regular polygon. The regular polygon may be, for example, a triangle, a pentagon, a hexagon or a polygon having more than six sides. The shroud may have a cross-sectional shape comprising a circle bisected by a square or rectangle so that its edges are semi-circular and parallel lines join the open ends to form a convex symmetrical shape. The shroud may change cross-sectional shape in the direction of fluid flow therethrough. The shroud may have a regular polygon cross-section at one or both of its ends. The shroud may have a rectangular cross-section at an intermediate portion between its ends. Each of these shapes advantageously provides a consistent temperature environment for the temperature sensor.

The temperature sensor may comprise any one of the group comprising a thermocouple, a resistive temperature sensor or an optical temperature sensor. The temperature sensor may comprise a platinum resistance thermometer.

The total temperature probe may further comprise a pressure sensor. Advantageously the probe may therefore also measure total pressure more accurately. The pressure sensor may be located adjacent to the temperature sensor or the temperature sensor may also function as a pressure sensor. The pressure sensor may be mounted in a tapping into the second cavity through the outer skin. Alternatively the pressure sensor may be mounted in a tapping into the second cavity through the plate to which the temperature sensor is mounted.

The at least one aperture in the inner skin may be aligned with or downstream of the temperature sensor. Advantageously fluid flow therefore passes over the temperature sensor.

The at least one aperture in the outer skin may be axially displaced from the at least one aperture in the inner skin. Additionally or alternatively, the at least one aperture in the outer skin may be circumferentially displaced from the at least one aperture in the inner skin. Beneficially, relative displacement between the apertures or arrays of apertures promotes fluid flow and thus heat transfer.

There may be more than one aperture in the inner skin, the apertures being arranged in a regular array around the periphery of the inner skin. There may be more than one aperture in the outer skin, the apertures being arranged in a regular array around the periphery of the outer skin.

Any combination of the optional features is encompassed within the scope of the invention except where mutually exclusive.

The present invention also provides an arrangement comprising an array of total temperature probes, a gas turbine engine comprising a total temperature probe and a gas turbine engine comprising an array of total temperature probes. Each of the total temperature probes may have any or none of the optional features as described.

The present invention will be more fully described by way of example with reference to the accompanying drawings, in which.

Figure 1:
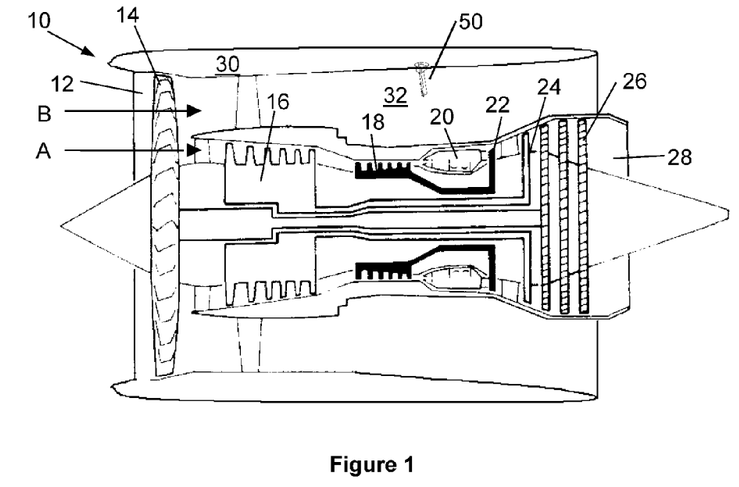
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. A total temperature probe according to the present invention may be mounted to static structure within the gas turbine engine 10 so that it receives working fluid flow through the engine during use. The total temperature probe may be located at any or all of the following locations in the gas turbine engine 10, or at any other location known to the skilled reader: the engine section stators between the fan 14 and the intermediate pressure compressor 16, the fan outlet guide vanes at the entrance to the bypass duct 32, at an intermediate location along the bypass duct 32, upstream of the intermediate pressure compressor 16, between the intermediate pressure compressor 16 and the high pressure compressor 18, between the high pressure compressor 18 and the combustor 20, downstream of any of the high pressure, intermediate pressure and low pressure turbines 22, 24, 26, and upstream of the low pressure turbine 26 where turbine gas temperature is conventionally measured. For example, FIG. 1 shows a total temperature probe 50 disposed inside of the gas turbine engine 10 at an intermediate location along the bypass duct 32. This is just one non-limiting example of where the total temperature probe 50 may be disposed, and the total temperature probe 50 may be disposed at any or all of the locations described above.

Figure 3:
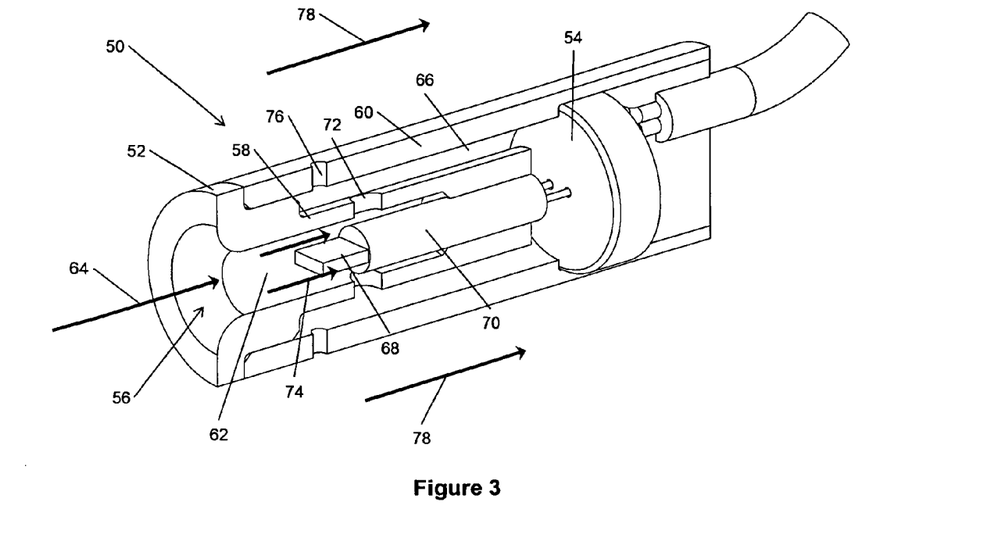
FIG. 3 is a cut-away perspective view of a total temperature probe according to the present invention.
Figure 4:
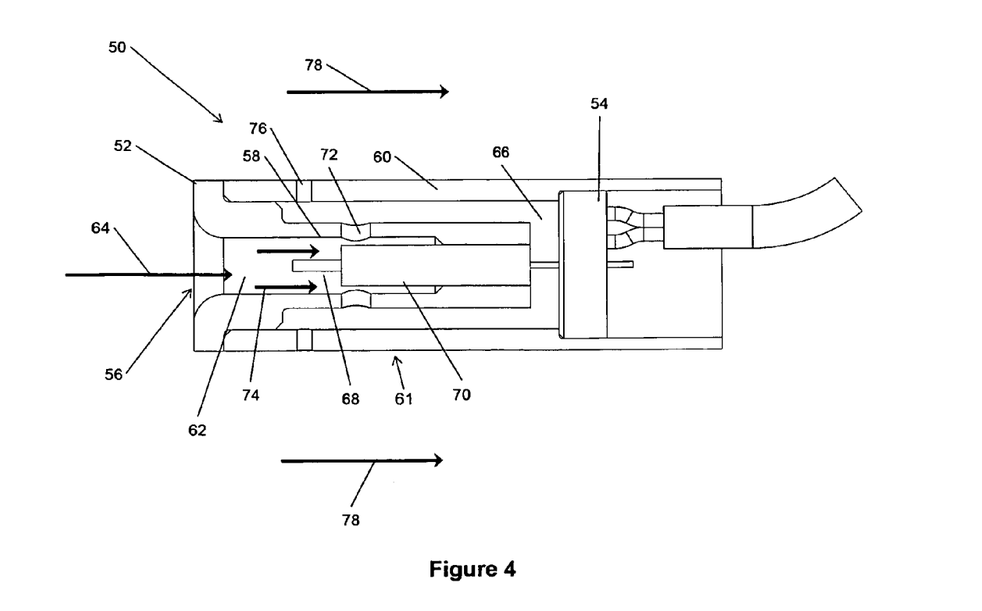
FIG. 4 is a sectional side view of the total temperature probe shown in FIG. 3.

An exemplary embodiment of the present invention is shown in FIGS. 3 and 4 which each show a total temperature probe 50. The total temperature probe 50 comprises a shroud 52 which is hollow and elongate. In the illustrated embodiment the shroud 52 is cylindrical. A plate 54 closes one end of the shroud 52 while the other end is open to form an inlet 56 with an axially middle (intermediate) portion 61 disposed between the two ends of the shroud 52. The shroud 52 is formed of a pair of skins, an inner skin 58 and an outer skin 60, which are spaced apart from each other. In the illustrated embodiment the inner skin 58 and the outer skin 60 are each cylindrical and are coaxial. The inner skin 58 and outer skin 60 are joined together or integrally formed at the shroud inlet 56.

The inner skin 58 defines a first cavity 62 which can receive a fluid flow through the inlet 56, as shown by arrow 64. The first cavity 62 is cylindrical in the illustrated embodiment. The plate 54 does not contact the inner skin 58. The inner skin 58, outer skin 60 and plate 54 together define a second cavity 66. The second cavity 66 as illustrated is C-shaped in cross-section, annular and is wrapped around the first cavity 62.

A temperature sensor 68 is mounted within the first cavity 62 so that it is bathed in the fluid flowing into the first cavity 62 through the inlet 56. The temperature sensor 68 is mounted to a mount stem 70 which is mounted to the inner skin 58 to close the end of the first cavity 62 that is distal to the inlet 56. Wires pass from the temperature sensor 68, through the mount stem 70 and are fixed to the plate 54 which preferably comprises a printed circuit board. The wires may be formed from silver, constantan (a copper nickel alloy having a low coefficient of resistivity) or another material as is appropriate for the specific application of the present invention. The mount stem 70 acts to isolate the temperature sensor 68 from strains transmitted by movement of the wires. The second cavity 66 extends sufficiently towards the inlet 56 that the temperature sensor 68 is axially further from the inlet 56 than the (forward) end of the second cavity 66.

The inner skin 58 includes at least one aperture 72 therethrough that permits fluid flow between the first cavity 62 and the second cavity 66. Preferably there is an array of apertures 72. For the illustrated cylindrical shroud 52, the apertures 72 may form an annular array at a defined axial distance from the inlet 56 and be equi-angularly spaced. Alternatively, the apertures 72 may have asymmetric spacing or be at different distances from the inlet 56. The apertures 72 through the inner skin 58 are preferably located axially further from the inlet 56 than the temperature sensor 68 so that the fluid flows through the inlet 56, arrow 64, along the first cavity 62 past the temperature sensor 68 in a symmetrical flow in the axial direction, arrows 74, and then passes through the apertures 72 into the second cavity 66.

The second skin 60 also includes at least one aperture 76 therethrough that permits fluid to flow from the second cavity 66 to join the freestream flow, shown by arrows 78, outside the total temperature probe 50. Preferably there is an array of apertures 76 which may be an annular array at a constant axial distance from the inlet 56 with the apertures 76 equi-angularly spaced. Alternatively the apertures 76 may be irregularly spaced or at different axial distances from the inlet 56.

The at least one aperture 76 through the outer skin 60 should be circumferentially or axially displaced from the at least one aperture 72 through the inner skin 58 to promote fluid circulation within the second cavity 66 and heat transfer from the fluid to the outer surface of the inner skin 58 and thence to the mount stem 70. The inner skin 58 may preferably be metal to improve heat conduction. This may mean that the fluid that flows from the first cavity 62 into the second cavity 66 through the at least one aperture 72 in the inner skin 58 is turned through 180° so that it travels parallel to the inside of the inner skin 58 and then parallel to the outside of the inner skin 58. The fluid then flows out of the shroud 52 through the at least one aperture 76 in the outer skin 60 where it is again turned through 180° to join with the freestream flow 78. Thus both sides of the inner skin 58 are exposed to the same fluid flow and so the heat conduction through the inner skin 58 is minimal. Advantageously, this means that the temperature measured by the temperature sensor 68 is closer to the total temperature than was possible with prior arrangements of total temperature probes such as the Kiel probe 34 described with respect to FIG. 2.

In one arrangement the array of apertures 72 through the inner skin 58 are axially aligned with the mount stem 70, downstream of the temperature sensor 68, and the array of apertures 76 through the outer skin 60 are axially aligned with the end of the second cavity 66 closer to the inlet 56. In another arrangement, the apertures 72 through the inner skin 58 are close to the end of the first cavity 62 closer to the plate 54. How close the apertures 72 may be to the end of the first cavity 62 may depend on manufacturing practicalities as will be apparent to the skilled reader. In other arrangements the apertures 72 may be aligned with the temperature sensor 68. In still other arrangements, the apertures 76 through the outer skin 60 are axially further downstream than the apertures 72 through the inner skin 58 so that the fluid flow is not turned through 180°. In further arrangements the apertures 72 through the inner skin 58 may be circumferentially displaced from the apertures 76 through the outer skin 60. The apertures 72, 76 may be axially aligned or may be axially displaced in addition to circumferentially displaced.

The apertures 76 through the outer skin 60 are preferably smaller than those through the inner skin 58, for example five times smaller, so that the pressure loss across the inner skin 58 is minimal. This has the effect that the fluid flow is further slowed so that the second cavity 66 and the portion of the first cavity 62 in which the temperature sensor 68 is located are filled with substantially stagnant fluid so that the temperature sensor 68 and the mount stem 70 are thermally insulated to control heat transfer. The apertures 72, 76 must be large enough that the fluid does continue to flow, albeit at low velocity, so that the temperature sensor 68 measures the temperature of the desired fluid flow and not static captured fluid in the first and second cavities 62, 66. The fluid flow may be turbulent to improve the heat transfer. The apertures 72 through the inner skin 58 may be shaped to promote turbulence given known parameters of the fluid flow such as Mach number, Reynolds number and flow rate.

Figure 5:
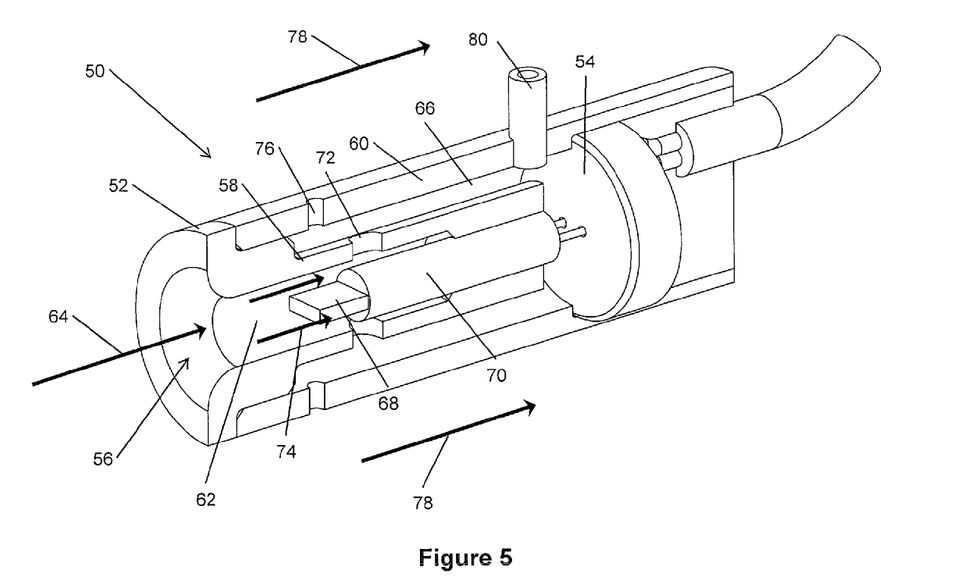
FIG. 5 is a cut-away perspective view of a total temperature probe according to the present invention including a total pressure sensor.

FIG. 5 shows an optional feature of the total temperature probe 50 of the present invention. In this arrangement a pressure sensor 80 comprising a tapping is provided into the second cavity 66. The pressure tapping 80 enables total pressure to be measured in the substantially stagnant fluid within the second cavity 66. Although the pressure measurement taken in this manner may not be as close to total pressure as at some conditions in prior arrangements, the pressure measurement is more stable than in prior arrangements because it is substantially independent of factors such as Mach number and Reynolds number. This arrangement enables a single probe 50 to be installed in a fluid flow to be measured from which more accurate total temperature and total pressure measurements can be taken. Alternatively, the temperature sensor 68 may be chosen to be a sensor capable of measuring both pressure and temperature. Or a pressure sensor may be located in the first cavity 62 adjacent to the temperature sensor 68. Advantageously, each of these arrangements is more compact than prior arrangements which required two separate probes.

The temperature sensor 68, in a preferred embodiment, is a platinum resistance thermometer (PRT). Alternatively it may be a thermocouple, resistive sensor or optical temperature sensor as will be readily apparent to the skilled reader. It will be understood that different temperature sensors 68 may be appropriate for different applications of the total temperature probe 50 according to the present invention. Similarly, the pressure tapping 80 or pressure sensor may be chosen to be most appropriate for the intended application of the present invention.

In the arrangements illustrated the shroud 52 is cylindrical; that is circular in cross-section and having constant radius at all axial distances from the inlet 56. However, alternative shapes of shroud 52 are envisaged within the scope of the present invention. For example, the shroud 52 may be a regular polygon prism; that is a regular polygon in cross-section and projected in the axial direction. In another example, the shroud 52 may be a regular polygon in cross-section at one or both ends, for example a triangle, pentagon, hexagon or a polygon having more than six sides, but be rectangular in cross-section in the axially middle (intermediate) portion 61, with the inner skin 58 and outer skin 60 blending smoothly from one shape to the other and back. Advantageously the rectangular cross-section portion coincides with the location of the temperature sensor 68 so that the flow is parallel over the temperature sensor 68. The shroud 52 may have a shape in cross-section that is composed of a circle bisected by a square or rectangle; that is its edges are semi-circular and parallel lines join the open ends to form a convex symmetrical shape. This shape advantageously provides a rectangular cross-section portion in which the temperature sensor 68 is mounted and curved portions to improve fluid flow.

It is preferred that the spacing between the inner skin 58 and the outer skin 60 is substantially constant, whatever the shape of the shroud 52, to maintain consistent thermal isolation of the temperature sensor 68. Similarly, the first cavity 62 and second cavity 66 are preferably coextensive in the axial direction so that the maximum axial extent of the inner skin 58 experiences the same fluid flow on both its sides thereby minimising the heat conduction across the inner skin 58.

Figure 6:
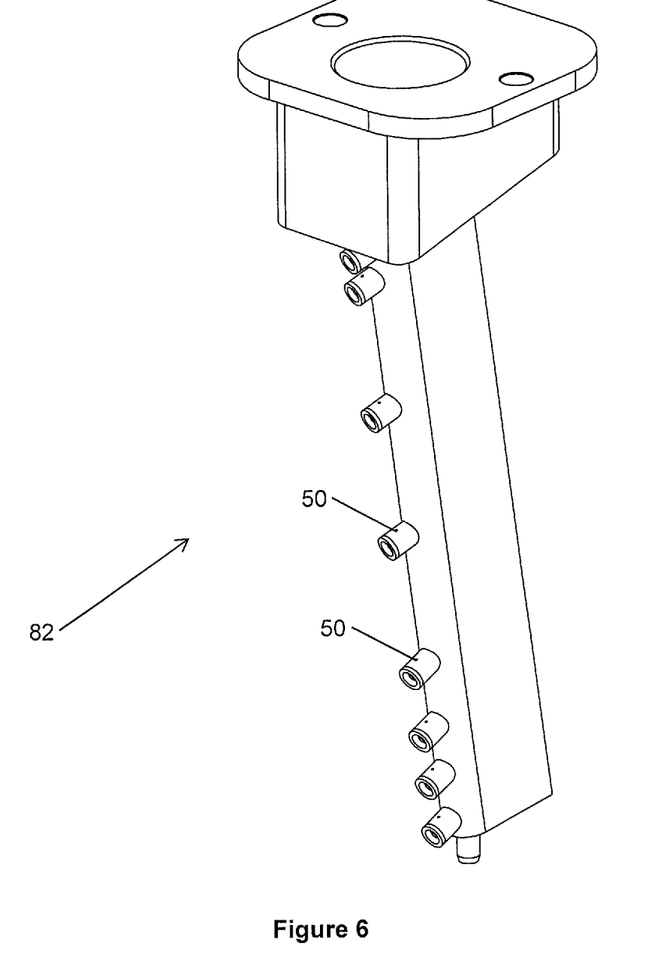
FIG. 6 is a perspective view of an array of total temperature sensors according to the present invention.
Figure 7:
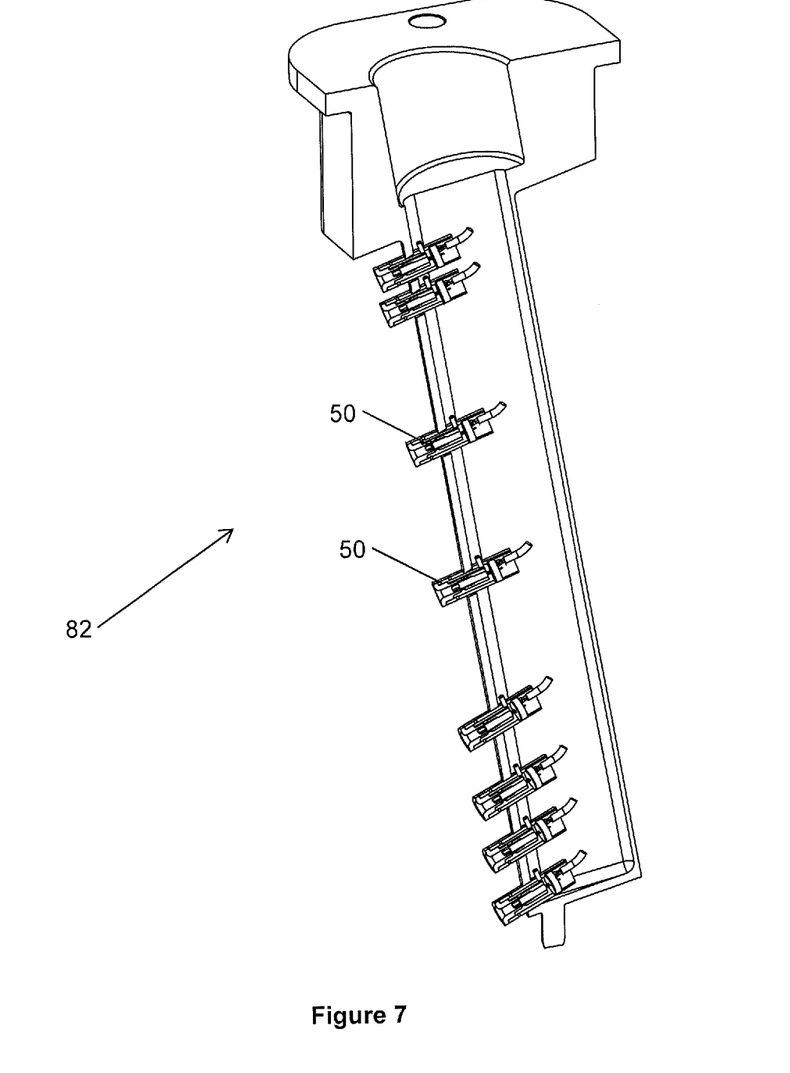
FIG. 7 is a cut-away perspective view of the array of total temperature sensors shown in FIG. 6.

FIGS. 6 and 7 illustrate an arrangement having an array 82 of total temperature probes 50 as previously described. The array 82 is illustrated as a linear array that could be positioned, for example, on the leading edge of an engine section stator between the fan 14 and the intermediate pressure compressor 16 so that each total temperature probe 50 is at a different radial distance from the centre line of the gas turbine engine 10.

Each total temperature probe 50 within the array 82 comprises the features previously discussed and may comprise the optional features also discussed. In some applications it will be appropriate that all the total temperature probes 50 in the array 82 are identical; in other applications the total temperature probes 50 may differ from each other, for example only some of the probes 50 including a pressure tapping 80 or pressure sensor.

The spacing of the total temperature probes 50 within the array 82 may be regular or irregular as is appropriate for the application as will be apparent to the skilled reader. The array 82 may be annular or another non-linear shape.

The pressure tapping 80 may be provided into the second cavity 66 through the plate 54 instead of through the outer skin 60. This may have installation advantages in some applications of this optional feature of the present invention.

The shroud 52 may have an irregular cross-sectional shape.

Although the apertures 72 through the inner skin 58 have been illustrated as having circular bore they may instead be slot shaped, that is elongate in the axial direction to increase the area and thus the flow through the apertures 72. Similarly the apertures 76 through the outer skin 60 may be slot shaped, although less flow is required through the apertures 76 than through the apertures 72 through the inner skin 58.

The inner skin 58 may comprise dimpling on its inner surface, defining the first cavity 62, or on its outer surface, partially defining the second cavity 66, or on both its inner and outer surfaces. The dimpling helps to heat the fluid in the first cavity 62 to close to the total temperature of the fluid flow. Alternatives to dimpling, such as fins, may be envisaged by the skilled reader.

The fluid may be air or another gas. It may also be a liquid if the heat transfer coefficient is insufficient to measure the total temperature of the liquid by other means.

The total temperature probe 50 of the present invention has been described for gas turbine engine 10 applications. However, the present invention finds utility in other applications where it is desirable to measure total temperature, and optionally total pressure, with an improved and known degree of accuracy. For example, it may be used in exhaust gas flows in aerospace, automotive, power generation or chemical engineering industries or for air flows over structures in environmental industries. It may also be used for any other gas flows in these industries.

The invention claimed is:

1. A gas turbine engine comprising a total temperature probe, the total temperature probe comprising:
  a hollow elongate shroud defined by a shroud wall that envelops a first cavity, the shroud wall comprising an inner skin and an outer skin which enclose a second cavity therebetween, the inner skin and the outer skin being separated by a constant distance; and
  a temperature sensor mounted in the first cavity,
  wherein the total temperature probe is disposed inside of the gas turbine engine and, in use, fluid flow for the gas turbine engine is received into the first cavity, passes through at least one aperture in the inner skin into the second cavity and thence passes out of the shroud through at least one aperture in the outer skin, such that heat conduction across the inner skin is minimal, the at least one aperture in the inner skin being axially and/or circumferentially displaced from the at least one aperture in the outer skin.

2. A gas turbine engine as claimed in claim 1 wherein the first and second cavities are coextensive.

3. A gas turbine engine as claimed in claim 1 wherein the shroud is annular.

4. A gas turbine engine as claimed in claim 3 wherein the inner and outer skins are coaxial.

5. A gas turbine engine as claimed in claim 1 wherein the shroud changes cross-sectional shape in the direction of fluid flow therethrough.

6. A gas turbine engine as claimed in claim 5 wherein the shroud has a regular polygon cross-section at one or both of its ends.

7. A gas turbine engine as claimed in claim 5 wherein the shroud has rectangular cross-section at an intermediate portion between its ends.

8. A gas turbine engine as claimed in claim 1 wherein the temperature sensor comprises any one of the group comprising a thermocouple, a resistive temperature sensor or an optical temperature sensor.

9. A gas turbine engine as claimed in claim 1, wherein the total temperature probe further comprises a pressure sensor.

10. A gas turbine engine as claimed in claim 9 wherein the pressure sensor is located adjacent to the temperature sensor.

11. A gas turbine engine as claimed in claim 9 wherein the pressure sensor is mounted in a tapping through the outer skin into the second cavity.

12. A gas turbine engine as claimed in claim 1 wherein the at least one aperture in the inner skin is aligned with or downstream of the temperature sensor.

13. A gas turbine engine as claimed in claim 1 wherein there is more than one aperture in the inner skin, the apertures being arranged in a regular array around the periphery of the inner skin.

14. A gas turbine engine as claimed in claim 1 wherein there is more than one aperture in the outer skin, the apertures being arranged in a regular array around the periphery of the outer skin.

15. A gas turbine engine comprising an array of total temperature probes as claimed in claim 1.

16. A gas turbine engine as claimed in claim 1 wherein the at least one aperture in the inner skin is circumferentially displaced from the at least one aperture in the outer skin.

* * * * *